United States Patent [19]

Schuster et al.

[11] Patent Number: 5,248,496
[45] Date of Patent: Sep. 28, 1993

[54] METHOD OF OBTAINING RUTHENIUM TETROXIDE BY OXIDATION OF AN AQUEOUS ALKALI METAL RUTHENATE SOLUTION

[75] Inventors: Ludwig Schuster, Limburgerhof; Dieter Voges, Mannheim, both of Fed. Rep. of Germany

[73] Assignee: BASF Aktiengesellschaft, Ludwigshafen, Fed. Rep. of Germany

[21] Appl. No.: 599,828

[22] Filed: Oct. 19, 1990

[30] Foreign Application Priority Data

Oct. 27, 1989 [DE] Fed. Rep. of Germany ....... 3935798

[51] Int. Cl.$^5$ .................. C01G 55/00; C22B 11/00
[52] U.S. Cl. ................................ 423/22; 423/579
[58] Field of Search .................... 423/579, 22

[56] References Cited

U.S. PATENT DOCUMENTS 4,132,569  1/1979  DePablo et al. .............. 423/22
4,642,134  2/1987  Van Antwerp et al. ......... 75/101

FOREIGN PATENT DOCUMENTS 51-68498   6/1976  Japan .................... 423/22
63-243232 10/1988  Japan .

OTHER PUBLICATIONS

Patent Abstracts of Japan, vol. 13 No. 145 of JP-A 63 307 103-Apr. 10, 1989.
Chemical Abstracts, vol. 94 No. 184680s Jun. 1981.
Chemical Abstracts vol. 104, No. 189243m Jun. 1986.

*Primary Examiner*—Theodore Morris
*Attorney, Agent, or Firm*—Keil & Weinkauf

[57] ABSTRACT

Ruthenium tetroxide is obtained by oxidation of an alkali metal ruthenate in aqueous solution. The oxidizing agent used is ozone. The oxidation is carried out at a pH greater than or equal to 8.

4 Claims, No Drawings

METHOD OF OBTAINING RUTHENIUM TETROXIDE BY OXIDATION OF AN AQUEOUS ALKALI METAL RUTHENATE SOLUTION

Ruthenium is frequently used as an ingredient of catalyst materials. Compounds of ruthenium are also useful for this purpose, a particular example being $RuO_2$, which is used as a component of the electrocatalytic coating on dimensionally stable anodes (DSA).

Accordingly, there is a frequent need to extract the ruthenium or ruthenium compound from the spent catalyst or electrode in order to recover it in the form of a useful compound of ruthenium.

The Czechoslovakian Copyright Certificate 211,980 describes such a process, in which the ruthenium is first of all dissolved in an alkaline solution of an alkali metal hypochlorite to give, say, sodium ruthenate. The sodium ruthenate is then oxidized with elementary chlorine to form ruthenium tetroxide, which is converted to ruthenium(IV) chloride with hydrochloric acid.

This process involves the following reaction equations:

$$Ru + 3\ NaOCl + 2\ NaOH \rightarrow Na_2RuO_4 + 3\ NaCl + H_2O$$

$$Na_2RuO_4\ Cl_2 \rightarrow RuO_4 + 2\ NaCL$$

$$RuO_4 + 8\ HCl \rightarrow RuCl_4 + 4\ H_2O + 2\ Cl_2.$$

One drawback of this process is the high consumption of chlorine involved, since this gas serves not only as the oxidizing agent but also as carrier gas. Another problem arises from the fact that the course of the reaction in the second stage is not reproducible. When the chlorine is passed into the strongly alkaline solution of sodium ruthenate, part of it disproportionates to form sodium chloride and sodium hypochlorite, which in turn decomposes to oxygen and sodium chloride. This side reaction causes the pH of the solution to assume more acidic values. Under these reaction conditions, the sodium ruthenate and the intermediate sodium perruthenate are no longer stable and decompose in undefined disproportionating reactions to form black deposits of ruthenium oxides which can no longer be oxidized by chlorine. These undesirable reactions occur according to an indefinite pattern and so frequently that the oxidation of sodium ruthenate to the tetroxide is not reproducible.

It is thus an object of the present invention to provide a method of obtaining ruthenium tetroxide by oxidation of an aqueous alkali metal ruthenate solution which avoids the drawbacks of the prior art processes.

We have found that this object is achieved by carrying out the oxidation by means of ozone at a pH above 8.

The starting material used in the process of the invention is an aqueous solution of an alkali metal ruthenate, e.g. sodium ruthenate, obtained in known manner by, say, oxidizing metallic ruthenium with sodium hypochlorite in a strongly alkaline solution. The said aqueous solution may contain the alkali metal ruthenate up to the saturation point. The concentration has no lower limit, since the reaction proceeds quantitatively. For technical reasons, however, it is advantageous to use concentrations ranging from 50 to 150 g per liter of solution. According to the invention, oxidation is effected using ozone or ozone-containing gases such as are produced, for example, in an ozonizer as a result of corona discharge in an atmosphere of oxygen. Such ozone-containing gases contain, in addition to oxygen, from 1 to 6% v/v of ozone.

The oxidation of the alkali metal ruthenate is carried out by bubbling the ozone-containing gas through the aqueous solution of the alkali metal ruthenate. It is advantageous to start oxidation under strongly alkaline conditions, i.e. at a pH of $\leq 12$, and, when the formation of ruthenium tetroxide slows down, to reduce the pH to 8–9 by slow and careful addition of an acid, for example hydrochloric acid, in such a manner that local acidification is avoided.

The reaction may be carried out at a temperature of from 0° to 100° C. The ruthenium tetroxide formed can be removed from the stream of gas by cooling the latter to $\leq 30°$ C., after which it can be worked up.

If the reaction is carried out at a temperature below the melting point of ruthenium tetroxide (27° C.), it is advantageous to heat the reaction mixture to a temperature of from 80° to 100° C. in order to drive off the ruthenium tetroxide.

EXAMPLE

The reactor used consists of a vessel having a capacity of 1 liter. This is equipped with a stirrer, a thermometer, a glass electrode for measuring the pH, an inlet tube, a dropping funnel and a bridged-shaped stillhead. The recipient vessel for the distillation head comprises an Erlenmeyer flask having a capacity of 250 ml. Its contents are stirred by means of a small magnetic stirring rod. All ground joints consist of ungreased and meticulously cleaned ground glass joints.

10.8 g (0.106 mole) of finely divided ruthenium and 8.5 g (0.212 mole) of sodium hydroxide in 20 ml of water are placed in the stirred vessel. The vessel is cooled with ice while 134 g of a bleaching solution containing 19.7 g of sodium hypochlorite (0.265 mole) is slowly added. During this operation, the temperature is kept between 5° C. and 10° C. Stirring is continued until practically all of the ruthenium has dissolved. An oxygen/ozone mixture containing 240 g of ozone per m³ (STP) is then passed through the resulting aqueous solution of sodium ruthenate (12.8% w/w of $Na_2RuO_4$) at a rate of 50 liters per hour.

After ozone has been bubbled through the solution for 15 minutes, the temperature is slowly raised to 100° C. over a period of 1 hour. Liberation of ruthenium tetroxide begins to take place shortly after the commencement of said temperature rise. When the amount of ruthenium tetroxide given off decreases, the pH is continuously lowered from 14 to a value of from 8 to 9 by the slow addition of concentrated hydrochloric acid. During this operation, all of the ruthenium distills off in the form of yellow, waxy tetroxide and is removed from the gas stream by cooling.

We claim:
1. A method of obtaining ruthenium tetroxide by oxidation of an aqueous alkali metal ruthenate solution which comprises: contacting the aqueous alkali metal ruthenate solution with an oxidizing mixture of oxygen and ozone at a pH above 8.
2. The method of claim 1, wherein said oxidation is started at a pH of $\leq 12$, after which the pH is lowered so as to be equal to 8–9 by the time oxidation has reached completion.
3. The method of claim 1, wherein the oxidation is carried out at a temperature of from 0° to 100° C.
4. The method of claim 2, wherein the oxidation is carried out at a temperature of from 0° to 100° C.

* * * * *